Dec. 20, 1938.  C. BRAUNE  2,141,125
APPARATUS FOR AUTOMATICALLY LOADING AND UNLOADING AERIAL CONVEYERS
Filed Oct. 22, 1936  7 Sheets-Sheet 1
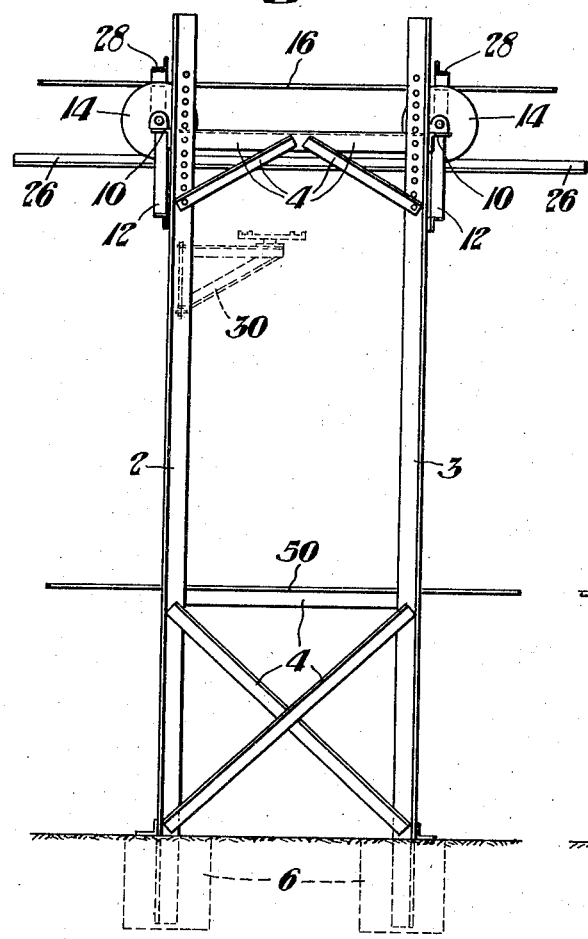
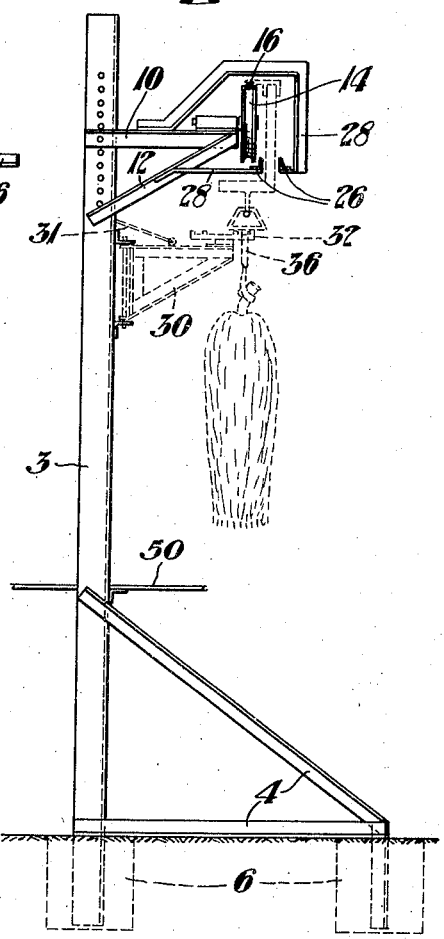
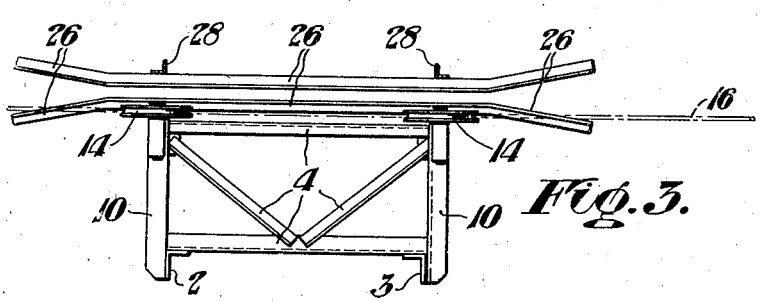
Inventor:
CARL BRAUNE,
by Usina & Rauber
his Attorneys.

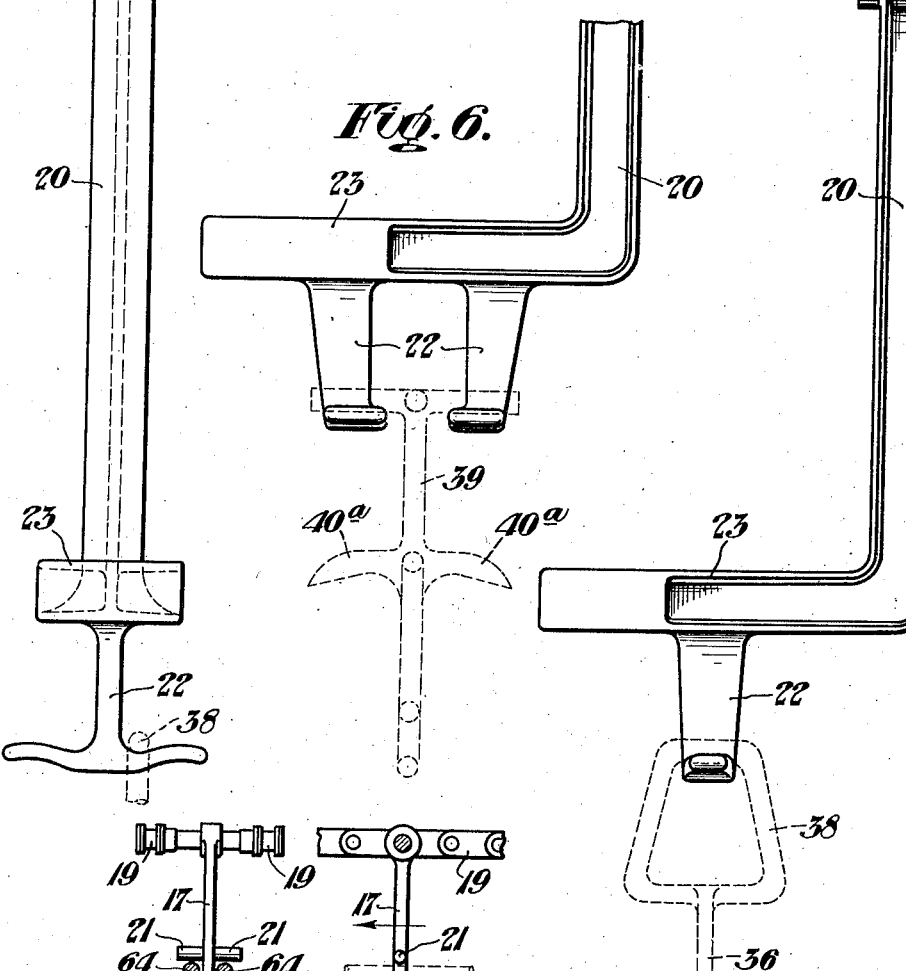

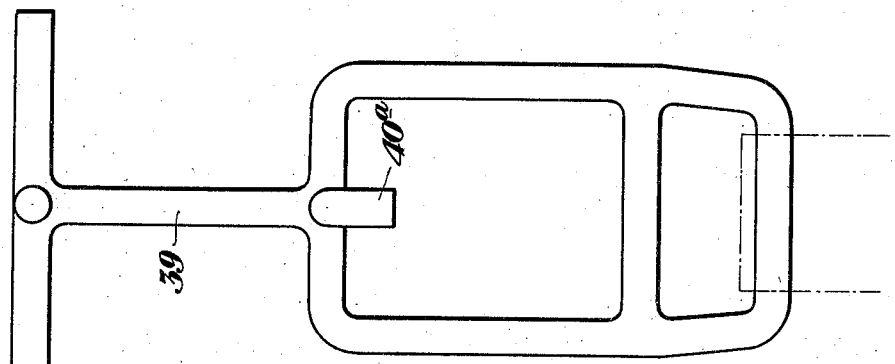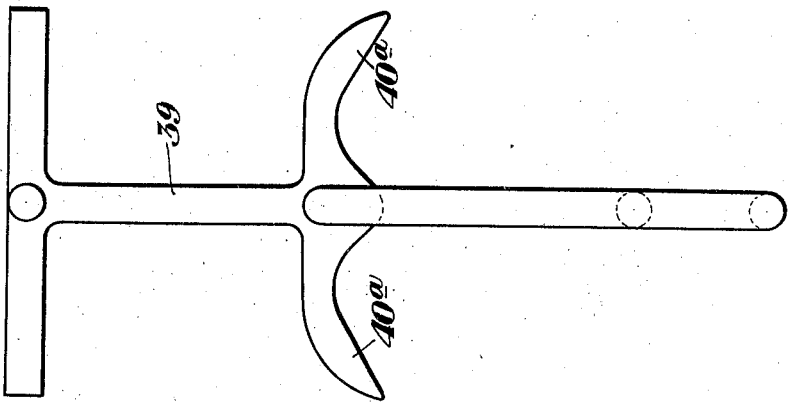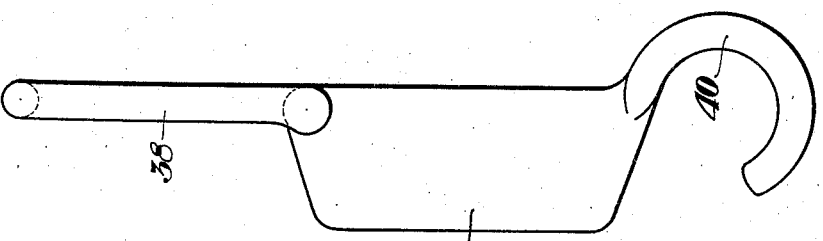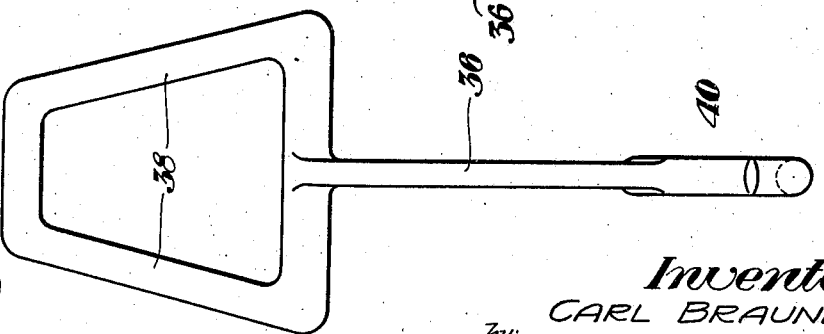

Dec. 20, 1938.   C. BRAUNE   2,141,125
APPARATUS FOR AUTOMATICALLY LOADING AND UNLOADING AERIAL CONVEYERS
Filed Oct. 22, 1936   7 Sheets-Sheet 4
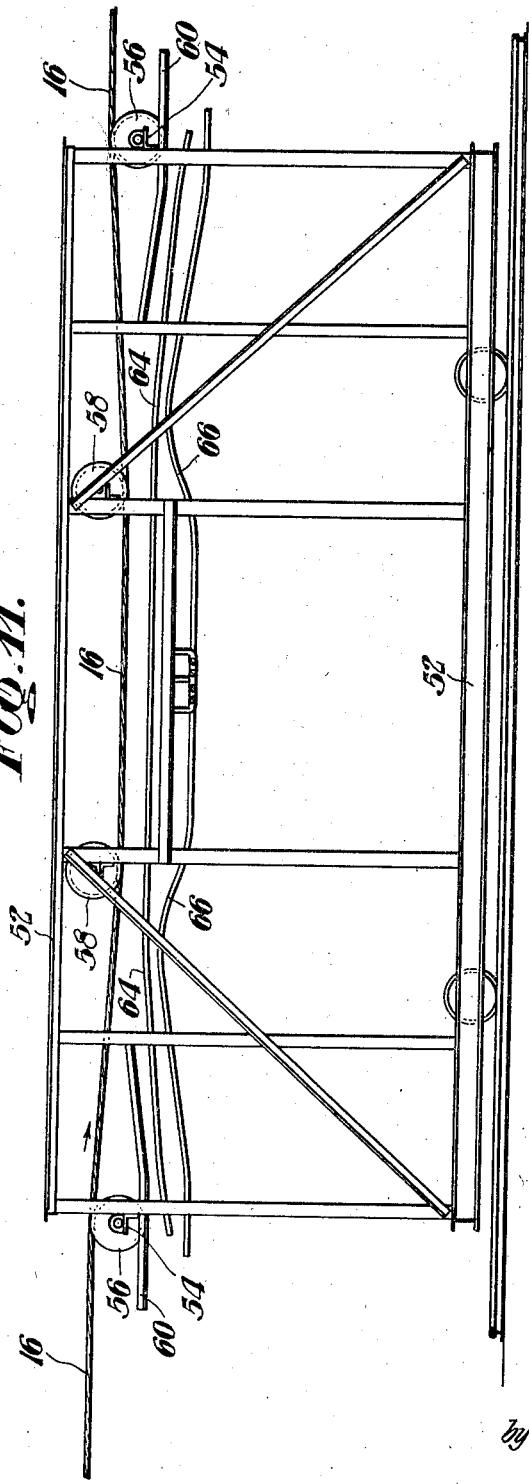
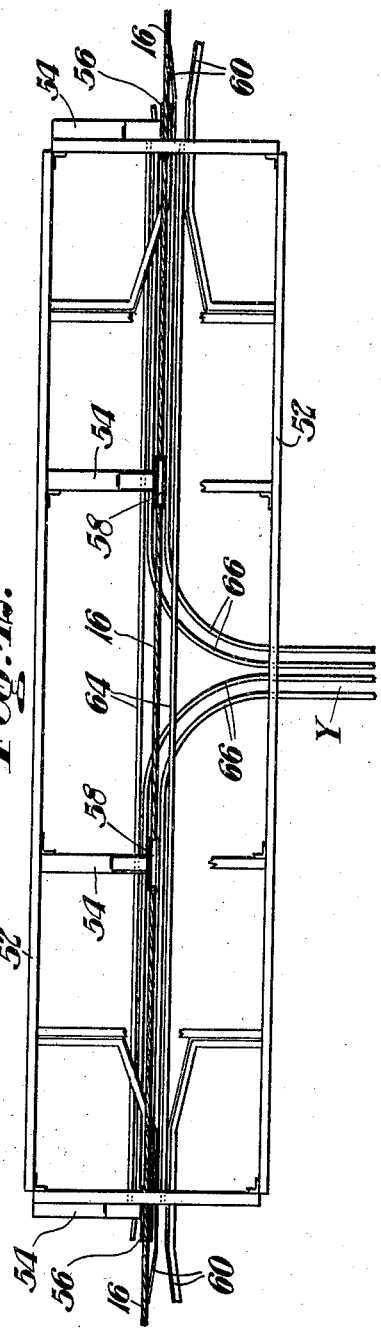
Inventor:
CARL BRAUNE,
by Usinas & Rauber
his Attorneys.

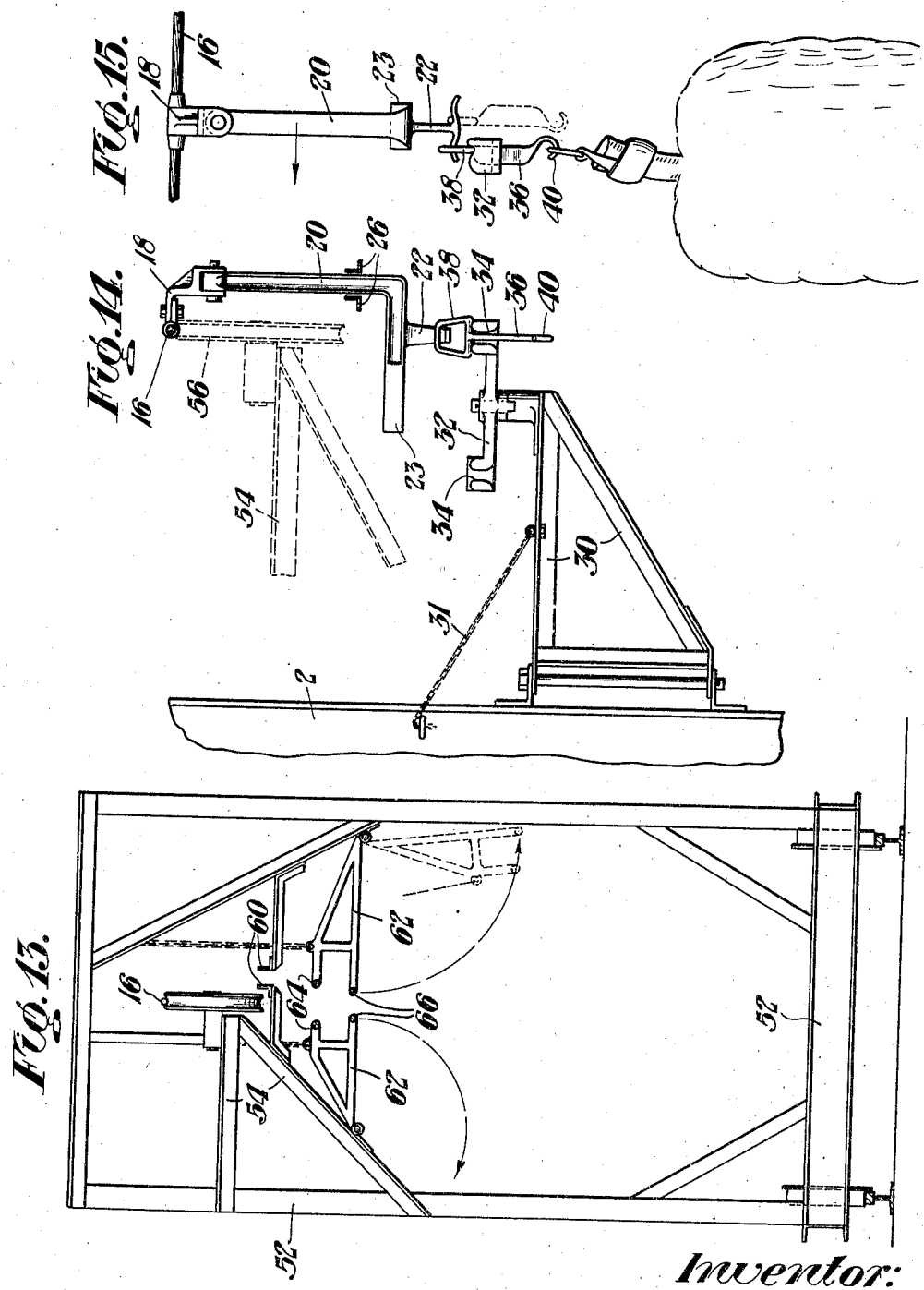

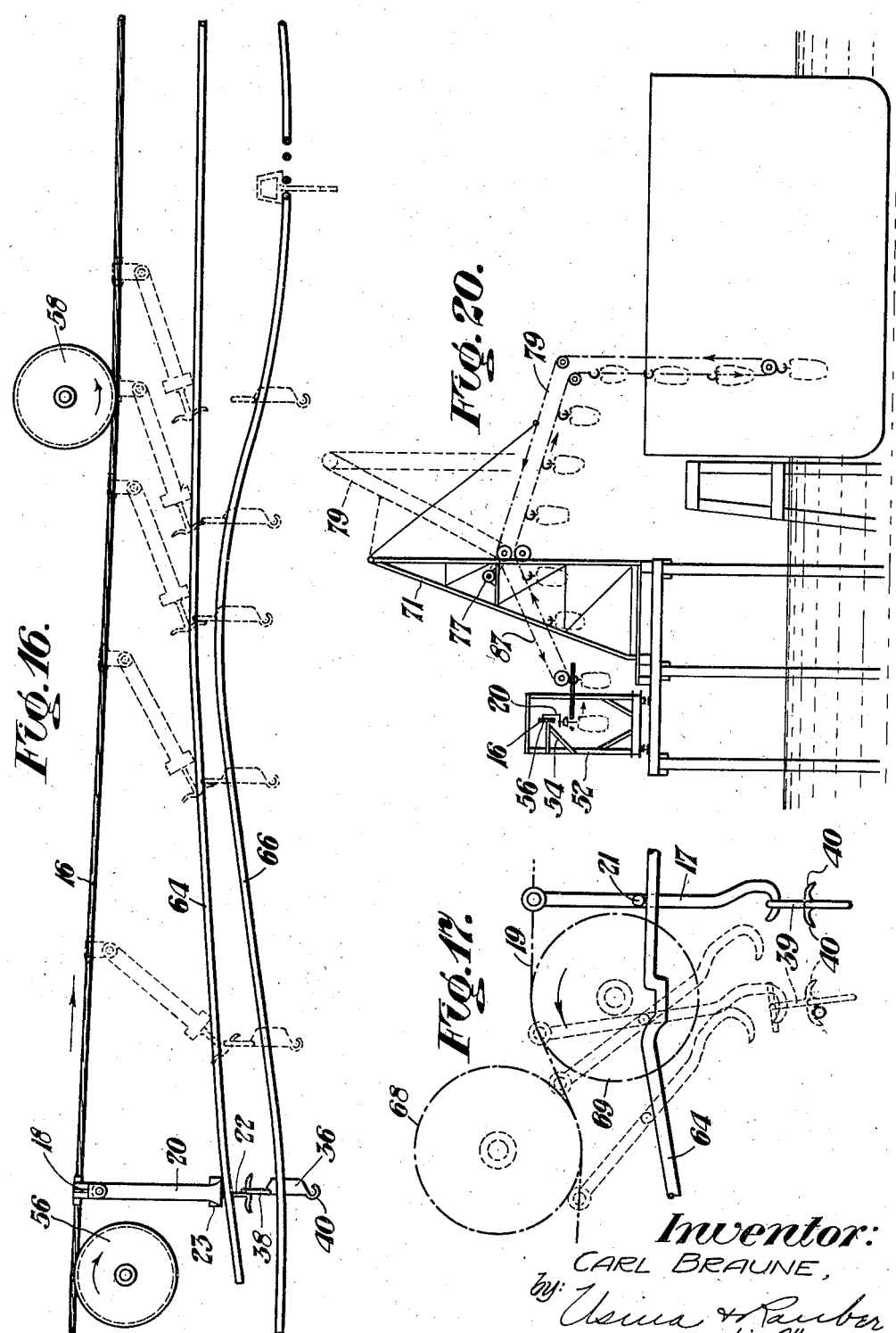

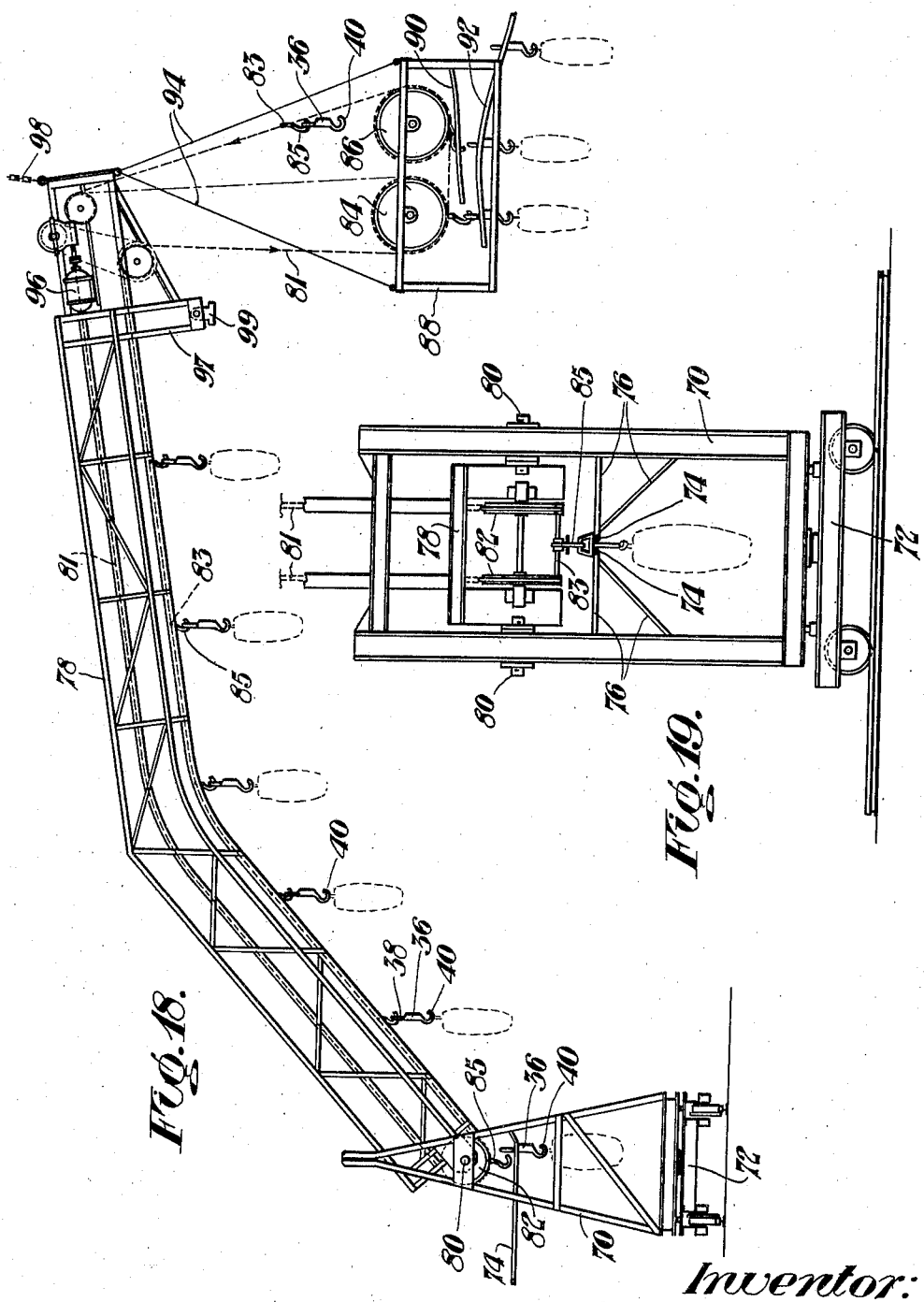

Patented Dec. 20, 1938

2,141,125

UNITED STATES PATENT OFFICE 2,141,125

APPARATUS FOR AUTOMATICALLY LOADING AND UNLOADING AERIAL CONVEYERS

Carl Braune, Worcester, Mass., assignor to The American Steel and Wire Company of New Jersey, a corporation of New Jersey Application October 22, 1936, Serial No. 107,068

12 Claims. (Cl. 198—177)

This invention relates to aerial conveyers and more particularly to apparatus for automatically loading and unloading a plurality of hangers attached to an endless aerial conveyer or tramway.

Aerial tramways or conveyers are ordinarily made to extend over a considerable area and are provided with several loading and one or more unloading stations. Aerial conveyers of the class described are particularly adapted for use on modern banana plantations, as these plantations extend over large areas and have a bulky and weighty fruit which must be carried long distances. As it is highly desirable that the handling and storing costs of the bundles of bananas be reduced to a minimum, the following method automatically handles the bananas from the time they are placed on the loading mechanism of the conveyer until they reach their storage compartment. However, the invention is not limited to use at banana plantations, as this is but one use to which the invention can be adapted.

An object of this invention is to provide aerial conveyers with means for automatically taking on loads and depositing these loads at any desired place.

Another object is to provide means which automatically load and unload an aerial conveyer and means by which the load can be automatically picked up by a second conveyer and then deposited from it at storage compartments.

The above and other objects will be shown in referring to the accompanying drawings and the following description, in which one best known form of the invention is represented and described.

Figure 1 is an elevation of a loading station exemplifying one embodiment of this part of my invention;

Figure 2 is a side elevation of the loading station shown in Figure 1;

Figure 3 is a plan of the loading means illustrated in Figure 1;

Figure 4 is a transverse elevation of a conveyer and a hanger suspended therefrom;

Figure 5 is a side elevation of the apparatus shown in Figure 4;

Figure 6 is a fragmentary elevation of a modified hanger member;

Figure 7 is an elevation of the hanger member of Figure 6, carrying a link secured to a conveyer;

Figure 8 is a side elevation of the hanger member of Figure 6;

Figures 9 and 9ᵃ illustrate the construction of the link by which the load is carried;

Figures 10 and 10ᵃ illustrate a modification of the link shown in Figures 9 and 9ᵃ;

Figure 11 is an elevation of one embodiment of automatic unloading apparatus;

Figure 12 is a plan of Figure 11;

Figure 13 is an end elevation of the showing of Figure 11;

Figure 14 is a fragmentary elevation of part of the apparatus;

Figure 15 is a fragmentary elevation of the manner in which a load is carried;

Figure 16 is an enlarged elevation of the automatic load removing apparatus;

Figure 17 is an elevation of a modified form of automatic load removing apparatus;

Figure 18 is an elevation of means which automatically convey loads to the hold of a ship;

Figure 19 is a fragmentary end elevation of the apparatus shown in Figure 18; and Figure 20 is an elevation of a modification of the apparatus shown in Figure 18.

A typical loading station used in conjunction with my invention is shown in Figure 1 of the accompanying drawings. The station has supports 2 and 3, preferably made of angle iron or the like, which are secured to each other and in the ground by any suitable means, such as by braces 4 and concrete bases 6, respectively. The supports 2 and 3 have arms 10 near their tops which extend perpendicularly from the supports and parallel to each other. Braces 12 aid in firmly positioning the arms 10. Pulleys 14, which support an endless cable 16, are rotatably mounted on the arms 10.

The cable 16 is driven in either direction parallel to its axis by any convenient means (not shown) and preferably has several speeds which can be used depending on the type of load carried by the conveyer.

When the cable 16 is not suitable for the carrying means used, a chain conveyer or the like can be substituted for the cable 16. Then, of course, conveyer sprockets must be used in place of pulleys and the number and type of supports required is slightly changed. For ordinary purposes the cable 16 is best suited to be used as the conveyer, and this construction will be that described.

In Figure 4, a hanger and the means connecting it to the cable are shown. Referring to Figure 4, split clamps 18 are secured to the cable 16 at spaced intervals. The clamps 18 are designed so that they do not interfere with the movement of the cable 16 over the pulleys 14. The clamps 18 pivotally suspend substantially L-shaped hangers 20 having feet 23 so that the foot 23 of the L is perpendicular to the axis of the cable 16, and the hangers 20 swing in the axial direction of the cable 16. The hangers 20 are suspended from the cable 16 in such a manner that they do not interfere with the cable's motion in any manner whatsoever. Each of the hangers 20 has means for engaging with load carrying means, such as a hook 22 extending downwardly therefrom. Each hook 22 preferably has slightly curved arms extending substantially perpendicular therefrom on two opposite sides thereof and parallel to the axis of the cable 16. In Figure 6, a modification of one of the hangers 20 is shown which has two hooks similar to the hooks 22.

In Figures 7 and 8, a hooked hanger 17 is shown suspended from a chain conveyer 19. The hanger 17 has arms 21 which are perpendicular to it and located approximately at the middle of the hanger 17. The arms 21 are also perpendicular to the axis of the motion of the conveyer 19. The hanger 17 is provided with one or two hooks at its lower end, depending on the type of load link which it is to carry. If desired, the hangers 17, or other similar hangers, can be substituted for the hangers 20.

In order to properly position the hangers 20 and thereby the hooks 22 when passing the loading station, the supports 2 and 3 have guide rods 26 mounted on arms 28. The rods 26 engage the hangers 20 and determine their path as they are drawn by the loading station. The support 2 has a triangular shaped member 30 pivotally mounted thereon. The free end of the member 30 can be swung into a position below the pulley 14 and in a fixed path of the hangers 20 when desired. The movement of the member 30 is limited by any convenient means, such as a stay wire 31, which is connected to the support 3 and the member 30. The wire 31 limits the member 30 to movement through a 90 degree arc and serves to hold the end of this member under the conveyer cable when so desired. The member 30 preferably has a swivel member 32 mounted on its free end. The swivel member 32 has slots 34 extending into opposite sides adjacent each end. The swivel piece 32 receives a load link 36 in the slot 34 so that the load link 36 can be placed in the fixed path of the hanger 20 as it passes the member 30. The swivel member 32 is so mounted and is provided with the two slots 34 in order that loads can be picked up from the member 30 regardless of the direction in which the cable 16 is moving. However, the link 36 can be supported directly by the member 30 if found expedient.

In Figure 9, the structure of the link 36 is completely shown. This construction is preferable in most cases, but it is shown merely as an example of one link that is adapted for use with this endless cable system. The upper position of the link 36 comprises a trapezoidal ring 38 which is at right angles to the body of the link 36. A hook 40 is at the bottom of the link 36 and the load to be carried is attached thereto. The body of the link 36 fits in the slots 34 and the base of the ring 38 sits on the swivel member 32 when the link 36 is put on the member 30. Then the link 36 is ready to be picked up by the hanger 20 on the cable 16.

When the end of the member 30 is placed in a position directly below the cable 16, the apparatus is so constructed that the hooks 22 on the hangers 20 pick up the link 36 by connecting with the ring 38.

A link 39, which is a modification of the link 36, is shown in Figure 10 and is adapted to be used with the hangers 20 when they have two hooks 22. The link 39 is of the cross-arm type and has curved arms 40$^a$ on which the link 39 rests when the link is being picked up or taken off the cable 16. The lower section of the link 39 is provided with means which support the load to be carried and is, for example, roughly in the shape of a B.

When the height of the conveyer or other reasons require it, a platform 50 is provided at the loading station. The loads are brought up to the platform 50 and fixed to the links 36 by any suitable means, such as by a leather strap having a hook at one end. The member 30 is moved out when an empty hook will be the next to pass the loading station, and the loaded link is picked up by the hook 22. When the hangers 20 are used, the supply of links at the loading station can be constantly replenished by putting empty links on the rear arm of the hook 22. These links can either be manually removed at the station or automatically moved by striking the swivel piece 32.

Automatic unloading apparatus, which can be fixedly mounted but preferably is mounted so that it can be moved to any desired place, is a part of the inventive concept. The apparatus is represented in Figures 11, 12 and 13 and includes a frame 52 which is rectangular in length and breadth. The frame 52 is preferably made of angle iron and braced so that a sturdy construction results. The apparatus to the left of the center line of Figure 12 will be that described, as the apparatus on the right of the center line duplicates that on the left and is provided to be used only when the conveyer is moving in the opposite direction than that shown in Figure 11. Brackets 54 are mounted on the inside of the frame 52. One of the brackets 54, at the end and on one side of the frame 52, projects toward the other side of the frame 52 and has a pulley 56 rotatably mounted at its end. Another pulley 58 is rotatably mounted from the bracket 54 near the middle of the frame 52 and bears down upon the cable 16. In this manner the pulleys 56 and 58 positively position the cable 16 in the frame 52. The frame 52 mounts guides 60 which make the hangers 20 follow a fixed course into the frame 52.

In order to automatically release the links 36 from the hooks 22, supports 62 position rods 64 and 66 in the frame 52. The supports 62, which are substantially V-shaped, are pivotally mounted on the frame 52 and the brackets 54 are held up by any means, such as supports connected to the top of the frame 52. The supports 62 can be rotated so that the rods 64 and 66 are positioned sufficiently below the cable 16 that the load on the conveyer passes through the frame 52 without being touched. When the supports 62 are in position, the rods 64 and 66 extend in a substantially horizontal direction. The upper rods 64 are closer together than the length of the foot 23 of the L-hanger 20 or the cross-arms 21 of the hanger 17, depending on which type hanger is used with the endless cable 16. The lower rods 66 are closer together than the width of the base of the ring 38 of the link 36 or the arms 40$^a$ of the modified link 39, depending again on which link is used. The ends of the rods 64 and 66 are flared out so they guide the hangers 20 and links 36 between them and determine their path through the frame 52. The guides 60 have so positioned the hangers 20 that they necessarily meet the rods 64 and 66.

In Figure 16, the method for automatically releasing the links 36 from the cable 16 is represented. The rods 62 and 64 are so formed and positioned that as soon as the hangers 20 enter the frame 52 the foot 23 strikes the rods 64 and momentarily prevents the foot 23 from moving forward. However, due to the forward motion of the cable 16, the top of the hanger 20 has continued to move forward so that the foot 23 is behind the top of the hanger. Once this lagging relation is established, the rods 64 gradually rise up nearer the cable 16 and force the foot 23 to lag the hanger top more and more. In the same distance in the frame 52, the rods 66, between which the link 36 is positioned, have gradually been rising so that the ring 38 of the link 36 rests on the rods 66. When the hangers 20 are tilted backwards the hooks 22 are, of course, also tilted, until finally the hooks 22 entirely free themselves of the link 36. This shifts the weight of the link 36 to the rods 66, but the hooks 22 continue to pull the link 36 along the rods 66. The rods 66 are made to curve downwardly soon after the hooks 22 completely release the link 36 so that the hangers 20 no longer control the link 36. The rods 66 continue to slope downwardly and then curve to one side so that gravity moves the link 36 to the point Y on Figure 12. The point Y can be provided with means whereby the link 36 is automatically picked up by a second conveyer or by any convenient means for putting the link 36 and load in storage. The rods 66 are cut in two immediately outside the frame 52 and the rods 64 are cut at the middle of the frame 52 so that when the supports 62 are swung down, the rods do not interfere with the motion of the supports 62. The section of the rods 66 outside the frame 52 can be supported by any convenient means.

A variation of the automatic unloading method is shown in Figure 17. This method is particularly adapted to be used with the hanger 17. In this method pulleys or conveyer sprockets 68 and 69 so position the conveyer 19 that it is bent sharply downward. When this unloading method is to be used, the rods 64 are provided with recesses and these rods and recesses are adapted to catch the arms 21 of the hanger 17 just as the conveyer 16 is made to bend downwardly. The arms 21 of the hanger 17 bear upon the rod 64 and prevent forward motion of the body of the hanger 17 when the conveyer 16 is moving forwardly and downwardly. The top end of the hanger 17 continues to move forwardly and downwardly and makes the arms 21 act as fulcrums for the hanger 17. The resulting pivoting action forces the hooked end of the hanger 17 back and up so that before the hanger 17 moves forward again the link 36 is released from the hanger 17 by gravity. The rods 66 are positioned to catch the link 36 as it is released and carry this link to the point Y of Figure 12.

In order to carry the loads from the endless cables directly to the hold of a ship, the conveyer assembly, shown in Figures 18 and 19, is provided. This assembly is preferably used in conjunction with the predescribed endless cable and assembly but either assembly can be used separately, if desired. A tower 70 is pivotally mounted on a carriage 72 which preferably is itself movably mounted. The tower 70 has rods 74, or other supporting means, mounted on it by brackets 76. The rods 74 connect to the point Y of Figure 12 so that the link 36 can be moved directly to the tower 70 by gravity, or other suitable means, from the frame 52. The tower 70 pivotally mounts a boom 78 by shafts 80 so that the member 78 can be moved in a vertical plane. The member 78 is in the form of a frame for a long rectangular box having a slight bend near its center and is made of any suitable material, such as angle or channel iron.

The member 78 preferably has a conveyer 82 mounted in or to it. The conveyer 82 is secured to the member 78 by the usual methods, such as by rollers and sprockets. The conveyer 82 preferably has two chains 81 connected by crossarms 83 on which hangers 85 are mounted. The hangers 85 are the same as the hangers 17 described in relation with the other conveyer. The rods 74 are so designed that the hangers 85 will automatically pick up the links 36 from the rods 74 when the conveyer 82 is moving in its regular course. The spacing of the hangers on the two conveyers should be the same or the conveyer speeds should be adjusted so that when a load link is released from one conveyer the other conveyer has a hanger ready to receive the load link. Near the free end of the member 78 the conveyer 82 is permitted to hang down and sheaves 84 and 86 are suspended therein if automatic unloading is desired. The sheaves 84 and 86 are mounted on a frame 88 so that their positions are fixed in relation to each other. The frame 88 also mounts rods 90 and 92 which are similar to the rods 64 and 66 and function in the same manner. This means that the load link 36 is automatically deposited on the rods 92 due to the above described removal action. The loads can then be removed from the links 36 and the links 36 placed on the conveyer 82 to be returned to the dock. The frame 88 is preferably suspended from the free end of the member 78 by cables 94.

If automatic unloading is not desired, the sheave 86, the cable 94 and the frame 88 can be dispensed with as the sheave 84 will hold its position due to gravity, and the conveyer 82 is strong enough to support the sheave 84.

The conveyer 82 returns to the tip of the member 78 from the sheave 84 or 86. The motivating means for the conveyer 82 can be positioned near the end of the member 78, as shown in Figure 18, and can be any suitable means, such as an electric motor 96 coupled to a reduction gear.

The member 78 is moved by an external force and is provided with a ring connection 98 by which the external force can be applied to the member 78. The end of the member 78 also has a projecting arm 97 which extends downwardly therefrom. A support 99, connected to the bottom of the arm 97, is adapted to support the free end of the member 78. The support 99 can include a base on which the member 78 can move, depending on whether the tower 70 is fixedly or movably mounted.

Figure 20 shows a modification of the apparatus used to convey the bananas to the boat. This modification shows a member 79 which is in two separate sections so that its motion is made quite flexible. A tower 71, used with the member 79, is made taller and heavier than the tower 70, as it is supporting the entire weight of the member 79. In addition, the load link 36 is picked up directly from the point Y, shown in Figure 12, by a conveyer 87 secured to the tower 71 and member 79. A motor 77, which drives the conveyer, is placed on the tower 71 as it is then both readily accessible and fixedly mounted.

It will be appreciated that the scope of the invention is not limited to the specific forms illustrated and described but is actually defined in the appended claims.

I claim:

1. Apparatus for automatically loading and unloading an aerial conveyer comprising in combination means pivotally suspended from said conveyer for engaging with load carrying means, a fixed support having guiding and rotatable supporting means for said conveyer, movable means adapted to be placed in the fixed path of said suspended means, load carrying means supported by said movable means whereby said suspended means engages with said load carrying means when said movable means is placed in the path thereof, means supporting said conveyer and fixing the paths of said conveyer and said suspended means at the unloading station, tripping means adapted to be moved into the fixed path of said suspended means for momentarily preventing forward motion of the bottom thereof and tripping said suspended means and discharging said load carrying means therefrom and means rising up under said load carrying means and supporting them and the loads carried thereby when they are released from said suspended means.

2. Apparatus for automatically loading and unloading an aerial conveyer comprising in combination hangers having means for engaging with other objects pivotally secured to said conveyer, a fixed support having guiding and rotatable supporting means for said conveyer and said hangers, movable means adapted to be placed in the fixed path of said hangers, load carrying links having an aperture therethrough and arms on their sides supported by said movable means whereby said hangers engages with said load carrying links when said movable means are placed in the path of said hanger, means supporting said conveyer and fixing the paths of said hangers and said conveyer at the unloading station, tripping means adapted to be moved into the fixed path of said hanger for momentarily preventing forward motion of the bottom of said hanger and tripping said hangers and discharging said load carrying means therefrom and means rising up under said load carrying means and supporting them and the loads carried thereby when released from said hangers.

3. Apparatus for automatically loading and unloading an aerial conveyer comprising in combination hangers having hooks at their bottoms pivotally secured to said conveyer, a fixed support which supports said conveyer, means positioning said hanger in relation to said support, a member adapted to be placed in a position in the fixed path of said hanger, load links supported by said member and adapted to be picked up by said hooks when in their fixed path, a frame supporting and positioning said conveyer at an automatic unloading station for said conveyer, guide arms positioning said hanger in relation to said frame, curved tripping means adapted to be moved into the fixed path of said hanger for momentarily preventing forward motion of the hook of said hanger and, due to the continued forward motion of said conveyer, tripping said hooks and discharging said load links therefrom and means rising up under said load links and receiving said load links and the loads carried thereby when they are tripped from said hanger by said curved means.

4. Apparatus for automatically loading a conveyer including a support which is firmly fixed in place, an arm mounted on said support, means over which said conveyer moves rotatably mounted on said arm, a hanger having a hook at its bottom suspended from said conveyer so that it can move in the direction of the axis of said conveyer, guide rods for guiding and positioning said hanger in relation to said support as said hanger passes said support, a pivoted member whose end can be swung to a position directly below said conveyer, a load link provided with means adapted to be engaged by said hanger and means on the end of said pivoted member by which the link is supported when placed thereon.

5. Apparatus for automatically loading a conveyer including a support which is firmly fixed in place, an arm mounted on said support, means over which said conveyer moves rotatably mounted on said arm, a hanger having a hook at its bottom suspended from said conveyer in such a manner that it can move in the direction of the axis of said conveyer, guide rods mounted on said support for guiding and positioning said hanger in relation to said support as said hanger passes said support, a pivoted member mounted on said support and adapted to be swung to a position directly below said conveyer, a swivel member having slots extending into one of its sides near each end secured to the end of said pivoted member, and a load link provided with means adapted to be engaged by said hanger, means by which the load is placed on the link and means by which said link is supported when placed in said slots of said swivel member.

6. Apparatus for automatically loading a conveyer including an upright support which is firmly fixed in place, an arm mounted on said support and extending at right angles thereto, a pulley over which said conveyer moves rotatably mounted on said arm, a clamp secured to said conveyer, a hanger having a hook at its bottom suspended from said clamp in such manner that it can move in the direction of the axis of said conveyer, guide rods which position said hanger in relation to said support as said hanger passes said support mounted on said support, a pivoted member whose end can be swung to a position directly below said conveyer mounted on said support, a swivel member having slots extending into one of its sides near each end secured to the end of said pivoted member and a load link provided with means adapted to be engaged by said hanger, means by which the load is placed on said link and means by which said link is supported when placed in said slots of said swivel member.

7. Apparatus for automatically unloading a conveyer including hangers provided with hooks carrying load links secured to said conveyer, a frame through which said conveyer passes, means rotatably secured to said frame for fixing the course of said conveyer therethrough, guide rods secured to said frame for determining said hangers' path therein, supports pivotally mounted by their bases to said frame so that they can move in a vertical plane, rods curved upwardly towards said conveyer and mounted on said support in the fixed path of said hanger for momentarily preventing the bottom of said hanger from moving forward whereby the bottom of said hanger is made to lag behind the end of said hanger connected to said conveyer and release said links therefrom and curved rods connected to said support, said curved rods being adapted to rise up under said links carried by said hanger to support said links when released from said hanger and convey said links by gravity out of said frame.

8. Apparatus for automatically unloading a conveyer including hangers provided with hooks carrying load links secured to said conveyer, a sturdy movable, rectangular frame through which said conveyer passes, pulleys rotatably mounted on said frame for fixing the course of said conveyer therethrough, guide rods secured to said frame for determining said hangers' path therein, supports substantially V-shaped, pivotally mounted by their bases to said frame so that they are vertical and can move in a vertical plane, rods curved upwardly towards said conveyer and mounted in the fixed path of said hanger for momentarily preventing the bottom of said hanger from moving forward when it enters said frame whereby the bottom of said hanger is made to lag behind the end of said hanger connected to said conveyer and releasing said load links therefrom, curved rods connected to the lower arm of said support and adapted to rise up under said links carried by said hanger to support said links when released from said hanger and convey said links by gravity out of said frame.

9. Apparatus for automatically transporting loads including a pivotally mounted tower, a boom pivotally mounted on said tower, a conveyer having two chains connected by cross-arms suitably mounted in said member, means motivating said conveyer, hangers pivotally suspended from said cross-arms of said conveyer, guide rods mounted on said tower in the path of said hangers, load links received on said guide rods and adapted to support a load and engage with said hangers, sheaves suspended from the free end of said member by said conveyer, a frame positioning said sheaves suspended from the free end of said member, curved means mounted on said frame and adapted to trip said hangers and release said load links therefrom, means adapted to receive said load links and their loads from said hangers when released from said hangers and a support for the free end of said member mounted on said member.

10. Apparatus for automatically releasing loads from a conveyer comprising a hanger having a hook adapted to carry a load link at its bottom and protruding sections on its sides attached to said conveyer, a support for said conveyer, means mounted on said support to determine the path of said hanger in relation to said support, two rotating members between which said conveyer passes and which cause said conveyer to bend downward sharply when passing said support, means adapted to be placed in the path of said protruding sections of said hanger and prevent said sections from moving forward when said conveyer is made to bend downwardly whereby said hanger pivots about the bottom of said protruding sections and, due to the forward and downward motion of the top of said hanger, trips said hook discharging said load link therefrom and means which are adapted to rise up under said load link and receive it and its load from said hook when said load link is released therefrom.

11. An aerial conveyer comprising in combination an endless conveyer cable, load receiving means pivotally suspended from said cable and adapted to engage with other objects, means for supporting said cable, load carrying means adapted to engage with said load receiving means, means adapted to place said load carrying means on said load receiving means, means adapted to retard the free end of said load receiving means and release said load carrying means from said load receiving means, means receiving said load carrying means and its load when said load carrying means is released from said load receiving means, means moving said load carrying means and its load to a remote point, a second conveyer adapted to pass said remote point and means on said second conveyer adapted to pick up said load receiving means and its load.

12. An apparatus for automatically removing loads from a conveyer including hangers pivotally carried by said conveyer and having means for carrying load links, a support having means for controlling the forward movement of said hangers and for retarding the forward movement of the bottom portion of said hangers by engagement with said hangers so that said hangers are tilted rearwardly to release said load links and means for supporting said released load links.

CARL BRAUNE.